(12) United States Patent
Ahn et al.

(10) Patent No.: US 10,041,203 B2
(45) Date of Patent: Aug. 7, 2018

(54) CLOTHES TREATING APPARATUS WITH HEAT PUMP

(71) Applicant: LG ELECTRONICS INC., Seoul (KR)

(72) Inventors: Hyukjin Ahn, Seoul (KR); Byeongjo Ryoo, Seoul (KR); Yongju Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 429 days.

(21) Appl. No.: 14/597,898

(22) Filed: Jan. 15, 2015

(65) Prior Publication Data
US 2015/0197882 A1    Jul. 16, 2015

(30) Foreign Application Priority Data
Jan. 16, 2014  (KR) .................. 10-2014-0005711

(51) Int. Cl.
| | | |
|---|---|---|
| *F26B 21/06* | (2006.01) | |
| *D06F 58/20* | (2006.01) | |
| *F25B 27/02* | (2006.01) | |
| *D06F 58/28* | (2006.01) | |
| *D06F 58/10* | (2006.01) | |

(52) U.S. Cl.
CPC ............ *D06F 58/206* (2013.01); *D06F 58/20* (2013.01); *D06F 58/28* (2013.01); *F25B 27/02* (2013.01); *D06F 58/10* (2013.01); *D06F 2058/287* (2013.01)

(58) Field of Classification Search
CPC .. D06F 58/206; D06F 2058/287; D06F 58/10; F26B 21/086; F26B 23/005; F26B 23/008; F26B 9/00; F26B 9/003; F26B 9/06; Y02B 30/52; F25D 12/02; F25D 23/006
USPC .............. 34/218, 468–470, 73–78, 138, 139; 165/240, 241; 62/331, 326, 237, 448
See application file for complete search history.

(56) References Cited

U.S. PATENT DOCUMENTS

| | | | | |
|---|---|---|---|---|
| 5,056,331 A | * | 10/1991 | Lotz ...................... | B41J 29/13 165/80.3 |
| 2005/0183440 A1 | * | 8/2005 | Holtzapple .......... | B01D 1/0058 62/333 |

(Continued)

FOREIGN PATENT DOCUMENTS

| | | |
|---|---|---|
| EP | 2 642 018 A2 | 9/2013 |
| JP | 2007-068870 A | 3/2007 |

(Continued)

OTHER PUBLICATIONS

European Search Report dated May 21, 2015 issued in Application No. 15150938.7.

*Primary Examiner* — John McCormack
(74) *Attorney, Agent, or Firm* — KED & Associates LLP (57) ABSTRACT

A clothes treating apparatus may include a heat pump that is detachable and controlled according to a plurality of operation modes. The plurality of operation modes may include a drying mode configured to control operation of the heat pump when the heat pump is mounted on the cabinet and a dehumidification mode configured to control operation of the heat pump when the heat pump is separated from the cabinet. The heat pump may be used in a separable manner when separated therefrom as well as when mounted thereon.

9 Claims, 9 Drawing Sheets

(56) References Cited

U.S. PATENT DOCUMENTS

| | | | |
|---|---|---|---|
| 2010/0077787 A1* | 4/2010 | Masuda | |
| 2010/0192639 A1* | 8/2010 | Kim | D06F 25/00 68/20 |
| 2011/0296702 A1* | 12/2011 | Pillot | |
| 2011/0304118 A1* | 12/2011 | Pettinger | B62K 9/00 280/259 |
| 2015/0040421 A1* | 2/2015 | Contarini | |

FOREIGN PATENT DOCUMENTS

| | | |
|---|---|---|
| JP | 2007202742 A * | 8/2007 |
| JP | 2008-183335 A | 8/2008 |
| WO | WO 2008/004803 A2 | 1/2008 |
| WO | WO 2009/020322 A2 | 2/2009 |
| WO | WO 2010/090472 A2 | 8/2010 |

* cited by examiner

CLOTHES TREATING APPARATUS WITH HEAT PUMP

CROSS-REFERENCE TO RELATED APPLICATION

This application claims the benefit and priority of Korean Application No. 10-2014-0005711, filed Jan. 16, 2014, the subject matter of which is incorporated herein by reference.

BACKGROUND

1. Field

The present disclosure relates to a clothes treating apparatus. More particularly, the present disclosure relates to a clothes treating apparatus having a separable heat pump.

2. Background

A clothes treating apparatus is an apparatus for processing various operations associated with clothes, and has a concept of including a washing apparatus for washing clothes, a drying apparatus for drying wet clothes, a refresher for removing odor permeated in clothes or removing wrinkles, and the like.

Clothes treating apparatuses have been developed to solve washing, drying, deodorization and wrinkle removal with one apparatus. Clothes treating apparatuses capable of recovering energy required to produce hot air used for drying of clothes and unused energy discharged to an outside to enhance energy efficiency have been developed. A clothes treating apparatus having a heat pump is an example of such a clothes treating apparatus.

The heat pump may transfer thermal energy contained in hot and humid air flowed from a clothing storage chamber from an evaporator to a refrigerant, and transfer thermal energy contained in the refrigerant to air flowed into the clothing storage chamber through a condenser, thereby producing hot air using waste energy. At this time, hot and humid air may be cooled in the evaporator while transferring energy to the refrigerant, and thus moisture contained in the air may be discharged as condensation water.

For a clothes treating apparatus having such a heat pump, components of the heat pump may be assembled into a cabinet in a fixed manner, and thus only the heat pump may be inseparable. Accordingly, there may be a problem that the heat pump can not be used in various ways.

SUMMARY OF THE INVENTION

An object of an embodiment of the present disclosure is to provide a clothes treating apparatus having a heat pump that may be separated from a cabinet to be independently operable.

Another object of an embodiment is to provide a clothes treating apparatus having a heat pump in which an operation mode when mounted on the cabinet is different from an operation mode when separated therefrom.

According to an embodiment of the present disclosure, there is provided a clothes treating apparatus having a heat pump, including a cabinet (comprising a clothing storage chamber); and a heat pump configured to transfer air to the clothing storage chamber, and separably mounted on the cabinet. The heat pump may include an evaporator, a compressor, a condenser and an expansion apparatus configured to form a refrigerant compression cycle. A heat pump controller may be configured to control operation of the heat pump according to a plurality of operation modes. A heat pump power supply unit may also be provided.

The configuration may have an effect in which the heat pump is separated from the cabinet to be independently operable.

The plurality of operation modes may include a drying mode configured to control operation of the heat pump when the heat pump is mounted on the cabinet, and a dehumidification mode configured to control operation of the heat pump when the heat pump is separated from the cabinet.

The configuration may be an effect in which the heat pump is controlled to dry clothes placed in the clothing storage chamber when mounted on the cabinet, and controlled to dehumidify external air when separated from the cabinet.

The heat pump controller may control a refrigerant compression cycle in such a manner that a temperature of air supplied by the heat pump in the drying mode may be higher than a temperature of air supplied by the heat pump in the dehumidification mode.

The configuration may be an effect in which since dehumidification is carried out in the heat pump in the dehumidification mode, air at a relatively lower temperature than that of the drying mode is supplied thereto, thus reducing energy used during an operation of the heat pump. Accordingly, control of the heat pump in the dehumidification mode, which is an operation mode when the heat pump is independently operated, may be carried out in a different manner from that in the heat pump, thereby enhancing energy efficiency.

The heat pump controller may control the refrigerant compression cycle in such a manner that the driving speed of the compressor in the drying mode is faster than that of the compressor in the dehumidification mode.

The heat pump controller may control the refrigerant compression cycle in such a manner that an extent of compressing refrigerant by the compressor in the drying mode is higher than that of compressing refrigerant by the compressor in the dehumidification mode.

The configuration may have an effect in which the quantity of heat is properly controlled in such a manner that heat energy transferred by refrigerant in the drying mode is greater than that in the dehumidification mode.

The heat pump may include an air intake port and an air discharge port, respectively, to communicate with the clothing storage chamber, and may further include a case provided with the evaporator, the compressor, the condenser, the expansion apparatus, the heat pump controller and the heat pump power supply unit.

The heat pump may further include a control panel provided on an outer surface of the case to receive a control command and transmit the control command to the heat pump controller.

The configuration may have an effect in which the heat pump can receive the power of the heat pump, and a control command such as an operation mode or the like from the outside even when separated from the cabinet to be independently controlled.

The heat pump power supply unit may further include a connecting portion connectable to an external power source. The clothes treating apparatus may further include a power supply unit of the clothes treating apparatus provided in the cabinet and connected to an external power source, and the connecting portion may be connected to the power supply unit of the clothes treating apparatus.

The configuration may have an effect in which the heat pump can immediately receive power from an external power source to operate for a long period of time when separated from the cabinet. The heat pump may receive power through the power supply unit of the clothes treating apparatus when mounted on the cabinet, and thus provide convenience since additional connection to the external power source is not required.

According to another embodiment, the heat pump may include a heater provided on an air passage, but provided downstream of the condenser. The heat pump controller may control the operation of the heater in the drying mode and maintain the heater to be in an off state in the dehumidification mode.

According to an aspect of the configuration, a heater may operate when the heat pump is controlled according to the drying mode, thereby having an effect of quickly performing the drying of clothes. The operation of the heater may be suspended when the heat pump is controlled according to the dehumidification mode, thereby having an effect of enhancing energy efficiency.

BRIEF DESCRIPTION OF THE DRAWINGS

The embodiments will be described in detail with reference to the following drawings in which like reference numerals refer to like elements wherein.

DETAILED DESCRIPTION

A preferred embodiment may be described in detail with reference to the accompanying drawing to allow those skilled in the art to easily implement the present disclosure. However, in describing the embodiments, the detailed description may be omitted when a specific description for publicly known functions or configurations is judged to obscure the gist of the present invention.

Embodiments may relate to a refresher for refreshing clothes and supplying hot air, but embodiments may not be necessarily limited to this, and the concept of the embodiments may also be applicable to other devices having a heat pump.

The term "refresh" may relate to a process of providing air, heated air, water, mist, steam and/or the like toward clothes to perform wrinkle removal, deodorization, sanitation, static electricity prevention, heating and/or the like.

The term "clothing" may include all objects on which washing is carried out, such as toys, towels, blankets as well as wearable objects such as shoes, socks, gloves, hats, scarves, and the like, in addition to clothes.

Figure 1:
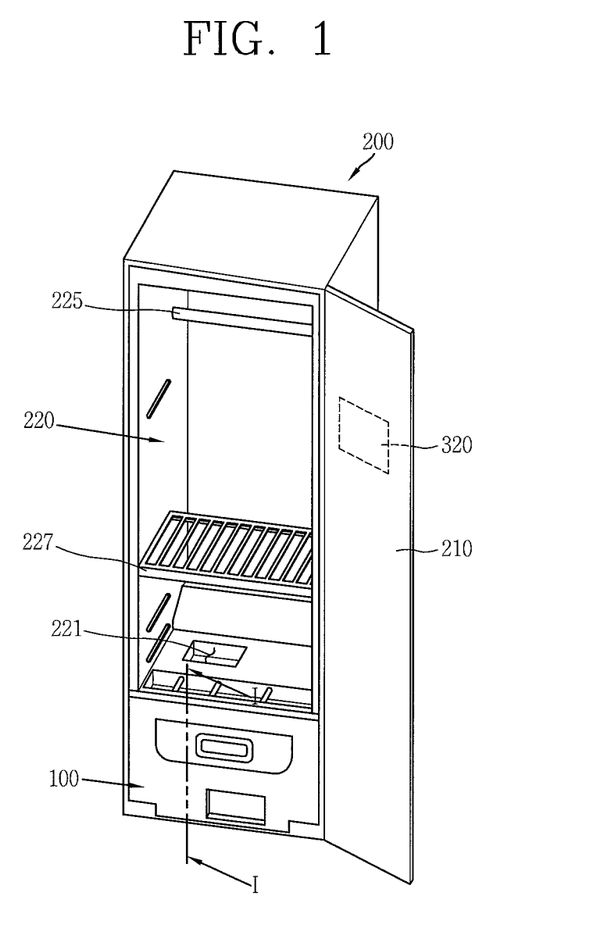
FIG. 1 is a perspective view illustrating a state in which a door of a clothes treating apparatus having a heat pump according to an embodiment is open.
Figure 2:
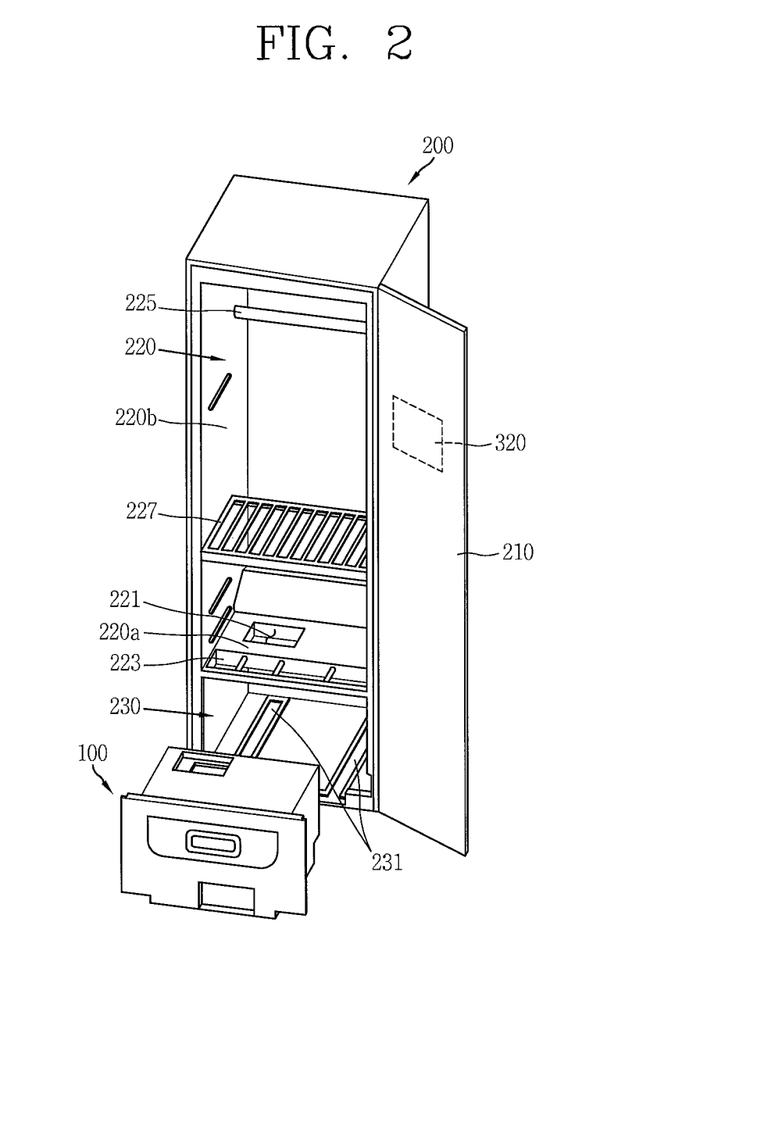
FIG. 2 is a perspective view in a state that a heat pump is separated from a clothes treating apparatus in the embodiment of FIG. 1.

FIGS. 1 and 2 show a clothes treating apparatus according to an example embodiment. Other embodiments and configurations may also be provided.

The clothes treating apparatus may include a cabinet 200 configured to form an external appearance thereof, a heat pump 100, a controller 310 and a control panel 320. The heat pump 100 may be detachably provided in the cabinet to be independently controllable. The controller 310 may be installed at the cabinet to control various components in the clothes treating apparatus. The control panel 320 may be configured to receive a control command and transmit the control command to the controller.

The cabinet 200 may include a clothing storage chamber 220 configured to provide a space for accommodating clothes, a heat pump storage chamber 230 in which the heat pump 100 is separably mounted, and a door 210 configured to open or close the clothing storage chamber 220 and the heat pump storage chamber 230 on which the control panel 320 is mounted. The heat pump 100 may be an apparatus (or device) for producing air or hot air to be supplied to the clothing storage chamber 220.

The clothing storage chamber 220 may include a mounting portion for mounting clothes, which are refresh objects. The mounting portion may include a clothing hanger 225 formed at an upper portion of the clothing storage chamber to hang clothes (or the like) and a rack 227 provided in a middle of the clothing storage chamber. The clothing hanger 225 may be formed in a rod shape and extend across the upper portion of the clothing storage chamber. The clothing hanger 225 may be provided at a middle portion as well as an upper portion of the clothing storage chamber, and may be provided in a separable manner in the clothing storage chamber. The rack 227 may be formed with a plurality of meshes and supporting legs on a substantially rectangular frame. Both edges of the rack 227 may be supported by a plurality of supporting protruding portions formed on a lateral surface 220b of the clothing storage chamber, and installed in a separable manner from the clothing storage chamber. The method of fixing (or attaching) the rack 227 to an inner lateral surface of the clothing storage chamber 220 may not be necessarily limited to this, and may be modified in various ways.

According to an aspect of the configuration, clothes may be provided on the clothing hanger 225 or the rack 227, and thus may be exposed to air or hot air in a spread manner to facilitate deodorization, wrinkle removal and/or drying. In other words, refresh performance of clothes may be enhanced.

The clothing storage chamber 220 may include an air supply port 221 configured to receive air or hot air, and an air discharge port 223 configured to transfer air in the clothing storage chamber 220 to the heat pump. The air supply port 221 and the air discharge port 223 may be formed to pass through a lower surface 220a of the clothing storage chamber.

Figure 3:
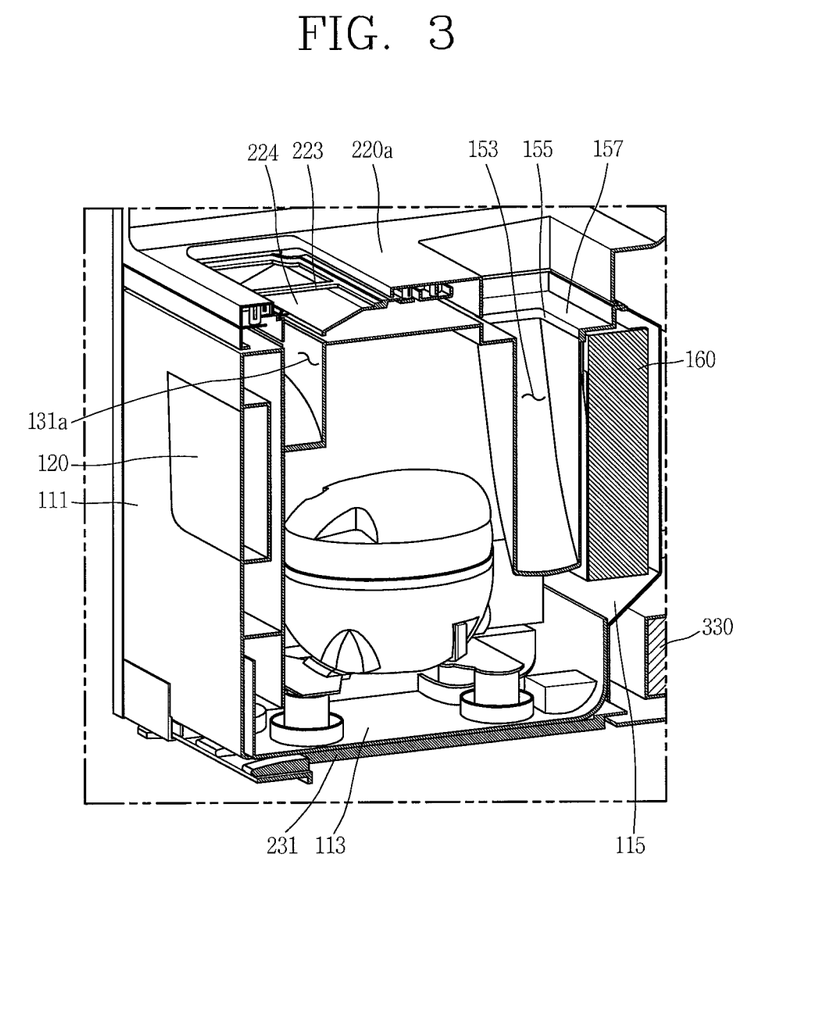
FIG. 3 is a cross-sectional perspective view taken along line I-I in FIG. 1.
Figure 4:
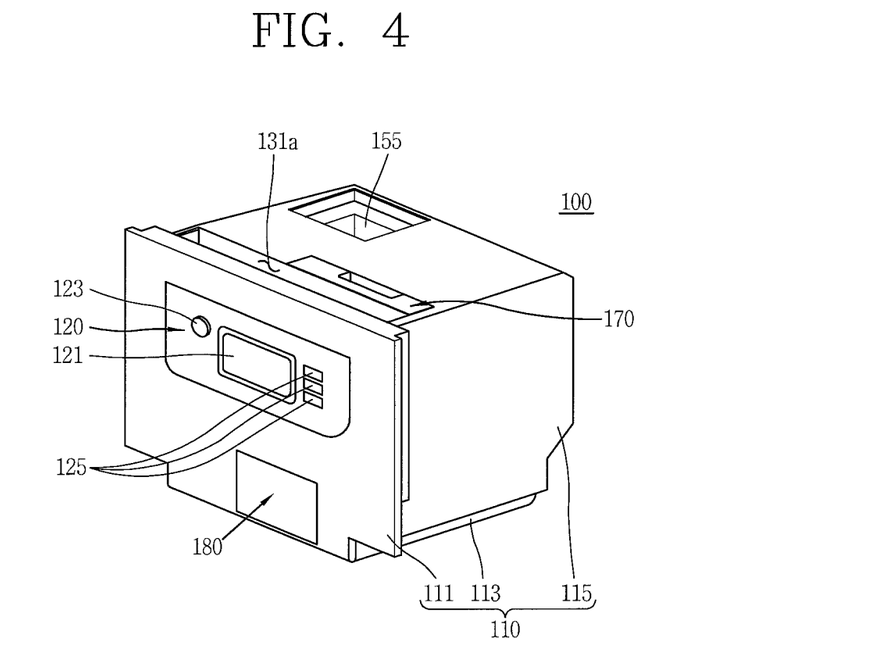
FIG. 4 is an enlarged perspective view illustrating a heat pump separated from a cabinet.

The air supply port 221 is a through hole formed in a substantially rectangular shape. As shown in FIG. 3, the air supply port 221 is formed with a same size as an air discharge port stepped portion 157 of the heat pump, and may be formed such that an inner lateral surface thereof has a predetermined height. Further, a cross-sectional area of the air supply port 221 may be formed to be greater than that of an air discharge port 155 (of the heat pump), and thus air or hot air flowed out of the air discharge port 155 (of the heat pump) may be supplied to the clothing storage chamber 220 without being leaked through a gap between the air discharge port stepped portion 157 and the air supply port 221 (of the clothing storage chamber).

According to the configuration, the heat pump has a structure in which an additional connecting member or sealing member is not provided between the air supply port 221 and the air discharge port 155 to easily separate the heat pump from the cabinet, but has an effect of efficiently transferring air or hot air from the air discharge port 155 to the air supply port 221.

Embodiments may not be necessarily limited to this, and a sealing member with elasticity may be provided in a fixed manner on a lower surface of the air supply port 221 to block a gap between the air supply port 221 and an upper surface of the case of the heat pump.

The air discharge port 223 may communicate with an air intake port 131a of the heat pump to transfer air in the clothing storage chamber 220 to the air intake port 131a. The air discharge port 223 may have a lattice-shaped frame shape partitioned into a plurality of through holes. The air discharge port 223 may be formed in front of a lower surface 220a of the clothing storage chamber as a whole. The air discharge port 223 may be formed to extend in a left and right direction of the clothing storage chamber. The air discharge port 223 may be formed to be larger than an inlet area of the air intake port 131a (of the heat pump).

FIG. 3 shows that the air discharge port 223 may include a taper portion 224 provided on a lower surface thereof. The taper portion 224 is provided between the air discharge port 223 and the air intake port 131a of the heat pump. The taper portion 224 may extend in an inclined manner toward an edge of the air intake port 131a (of the heat pump) from a frame edge of the air discharge port 223. The area of the air discharge port 223 may be formed to be larger than the inlet area of the air intake port 131a, and thus the taper portion 224 may be formed in a shape in which a width gradually decreases as being extended from the frame edge of the air discharge port 223 to the edge of the air intake port 131a. Accordingly, the taper portion 224 has a lateral surface formed in an inclined manner toward the air intake port 131a and a lower surface that is open in a same shape as an inlet of the air intake port 131a.

According to the foregoing configuration, air passing through the air discharge port 223 is guided by the taper portion 224 and flows into the air intake port 131a, and thus is not leaked from a gap between the air discharge port 223 and the air intake port 131a. Accordingly, the heat pump has a structure in which an additional connecting member or sealing member is not provided between the air discharge port 223 and the air intake port 131a to easily separate the heat pump from the cabinet, but has an effect of efficiently transferring air or hot air to the air intake port 131a.

Embodiments may not be necessarily limited to this configuration, and a sealing member having elasticity instead of the taper portion 224 may be formed on the air discharge port 223. The sealing member may be formed in a fixed manner on a lower surface of the edge of the air discharge port 223 to seal between the air discharge port 223 and an upper surface of the case of the heat pump when the heat pump is mounted on the cabinet. The sealing member may be formed on the taper portion 224 to seal between the taper portion 224 and the air intake port 131a.

The heat pump storage chamber 230 is a space for accommodating the heat pump at a lower portion of the cabinet. The entire space of the cabinet may be partitioned into an upper portion and a lower portion by the lower surface 220a of the clothing storage chamber. The clothing storage chamber may be formed in the upper portion, and the heat pump storage chamber 230 may be formed in the lower portion. Accordingly, the lower surface 220a of the clothing storage chamber may become an upper surface of the heat pump storage chamber 230.

A front surface of the heat pump storage chamber 230 may be open, and the front surface may be closed by a front cover 111 of the heat pump. The front surface of the heat pump storage chamber 230 may have a plate-shaped insertion plate at both lower edges, and the front cover 111 of the heat pump has a groove-shaped insertion groove having the same shape as the insertion plate. The insertion plate of the heat pump storage chamber 230 and the insertion groove of a front cover 111 of the heat pump are engaged with each other to accommodate the heat pump 100.

Figure 7:
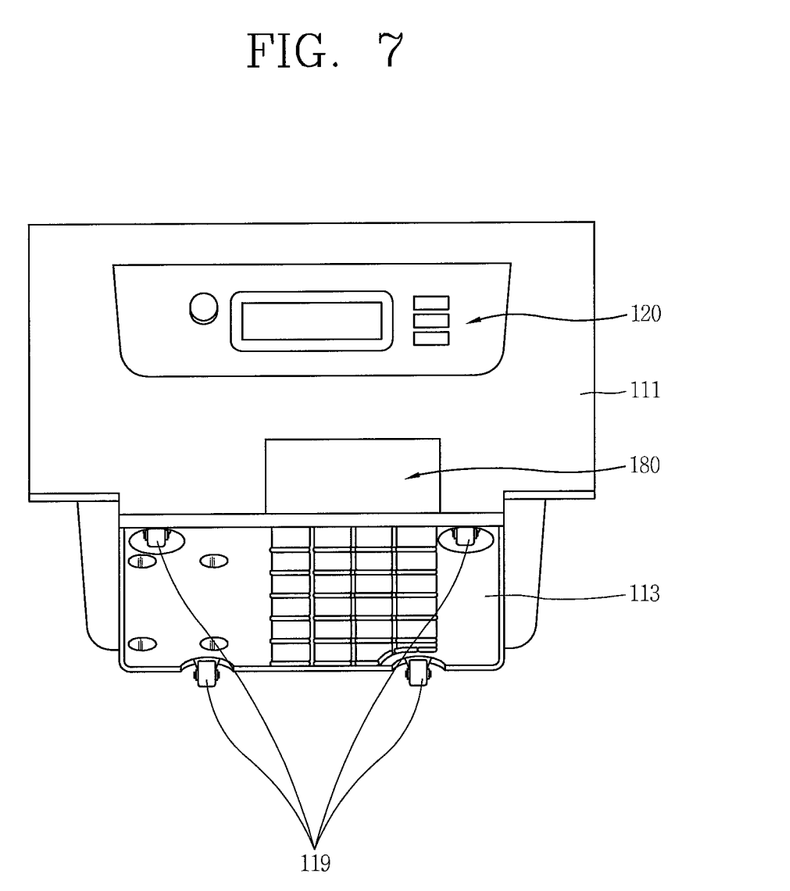
FIG. 7 is a bottom perspective view illustrating a heat pump (of FIG. 4)

A guide rail 231 for guiding wheels of the heat pump 100 may be provided on a lower surface of the heat pump storage chamber 230 to extend in a front and rear direction of the cabinet. As shown in FIG. 7, for the heat pump, four wheels 119 may be provided on a base 113 corresponding to a lower surface of the case in such a manner that a distance between two wheels provided at the front side is different from a distance between two wheels provided at the rear side. The guide rail 231 may guide two wheels provided at the rear side of the base. A horizontally extended frame may be provided on a front lower surface of the heat pump storage chamber 230 to block two front wheels of the heat pump when the heat pump is mounted (or provided) on the heat pump storage chamber.

Accordingly, the heat pump 100 may be easily mounted on (or separated from) the heat pump storage chamber 230 by the guide rail 231. The heat pump may be stably inserted to the heat pump storage chamber 230 by the insertion groove and the insertion plate, and two front wheels of the heat pump may be fixed by a frame intersecting the front side of the lower surface of the heat pump storage chamber 230, and thus the heat pump may be securely fixed (or attached) to the cabinet.

Referring to FIGS. 3 through 10, the heat pump 100 may include a case 110 configured to form an external appearance thereof and provided with various components, a control panel 120 provided on an outer surface of the case 110, a duct configured to form an air passage, a refrigerant compression cycle 140 configured to heat and/or dehumidify air, a blower fan assembly 150 with an exhaust duct to provide blowing power so as to move air through the air passage, a heat pump controller 160, a filter unit 170, a water pail 180 and a heat pump power supply unit 190.

Figure 5:
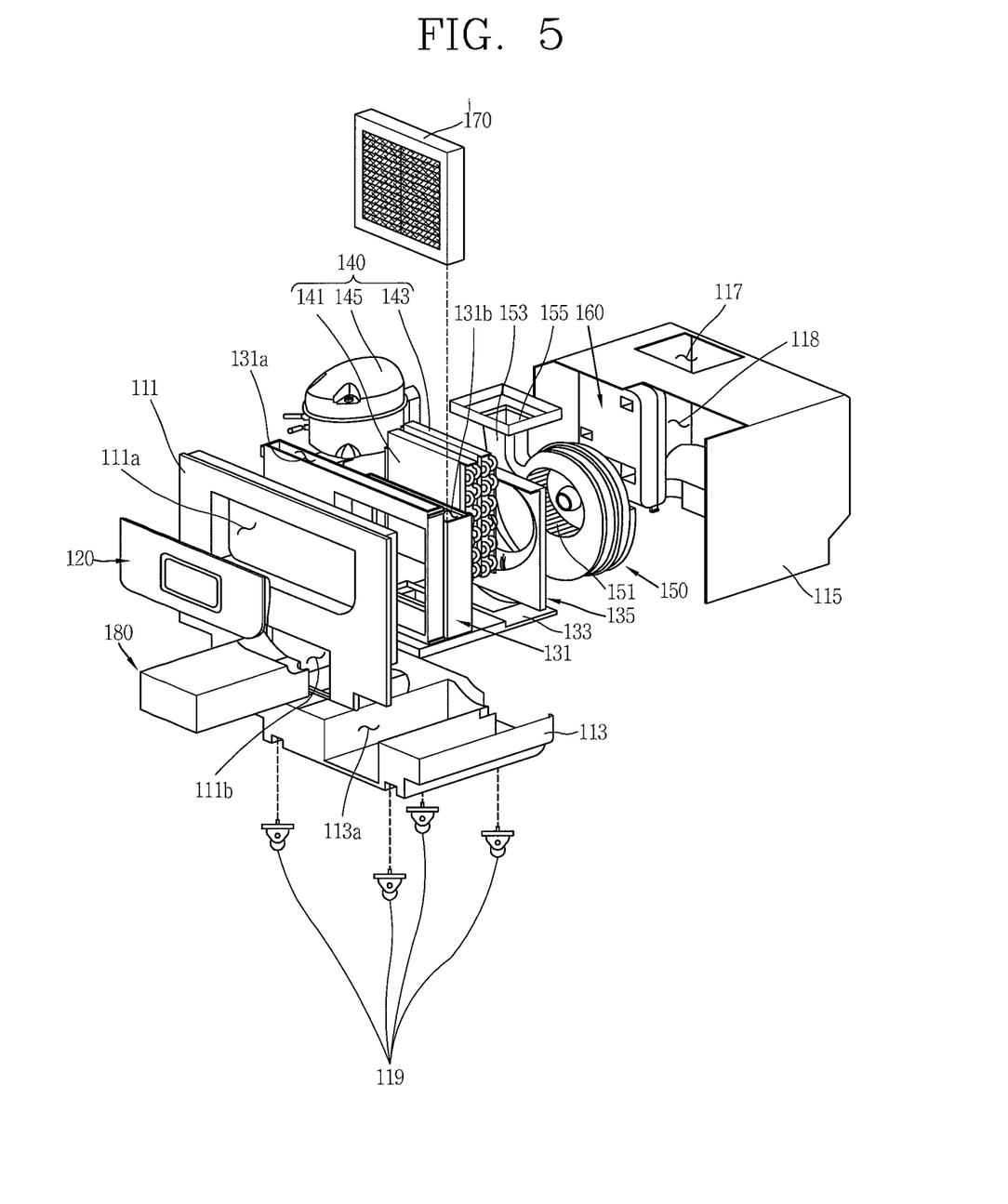
FIG. 5 is an exploded perspective view illustrating a heat pump (of FIG. 4)

The case 110 may include the front cover 111, a base 113 constituting a bottom surface and a case body 115. The front cover 111 may constitute a front surface of the heat pump 100, and an insertion groove may be formed at both lower edges thereof as described above. The front cover 111 may be formed with a through hole 111b to access the water pail 180. A control panel mounting portion 111a, on which the control panel 120 is mounted, may be formed on an outer surface of the front cover 111.

The base 113 may be coupled to the front cover 111 and the case body 115, and four wheels 119 may be provided on a lower surface thereof. For the four wheels 119, two wheels are provided at the front side and two wheels are provided at the rear side in such a manner that a distance between the wheels provided at the front side is larger than a distance between the wheels provided at the rear side. The base 113 may include a space 113a accommodating the water pail 180. The space 113a accommodating the water pail 180 may be formed at a lower portion of the evaporator 141 forming the refrigerant compression cycle.

The case body 115 may include a front surface, a rear surface and both lateral surfaces, and a through hole 117 to communicate with the air supply port 221 is formed on the upper surface. The filter unit 170 may be inserted to the front side of the upper surface and a cutting portion 118 may be provided to expose the air intake port 131a.

The refrigerant compression cycle 140 may include an evaporator 141, a compressor 145, a condenser 143 and an expansion apparatus 147. Refrigerant may supply heat while passing through the expansion apparatus 147 after being compressed in the compressor 145, and may receive heat from the evaporator 141 after being expanded while passing through the expansion apparatus 147. This may be called a refrigerant compression cycle 140. Heat may be transferred to the refrigerant while air passes through the evaporator 141 to cool the air, and heat may be transferred from the refrigerant while air passes through the condenser 143 to heat the air. The dehumidification and heating of air due to the refrigerant compression cycle 140 may be described below. The evaporator 141 and the condenser 143 may be provided at a lower duct 133 which may be described below, and the compressor 145 is provided at one side of the base 113. The evaporator 141 may be provided at an upstream of the condenser 143 to flow air that has passed through the evaporator 141 to the condenser 143.

The duct may include a front duct 131, a lower duct 133 and a rear duct 135. The front duct 131 is provided at an upstream of the evaporator 141, and the air intake port 131a is formed to transfer air flowed from the clothing storage chamber 220 to the evaporator 141. The front duct 131 may be formed between the air intake port 131a and the evaporator 141 and a filter insertion portion 131b may be provided into which the filter unit 170 is inserted. The rear duct 135 is provided at a downstream of the condenser 143 to guide air that has passed through the condenser 143 to the blower fan 151. The lower duct 133 is disposed below the evaporator 141 and the condenser 143, and extends from a lower portion of the front duct 131 to a lower portion of the rear duct 135. Condensation water passage for guiding condensation water produced by and flowed down from the evaporator 141 to be collected to the water pail may be further formed on a lower surface of the lower duct 133.

The filter unit 170 may be formed with a filter net on a filter frame to filter out foreign materials to prevent them from being infiltrated into the duct and other components including the evaporator 141 and the condenser 143. An upper portion of the filter unit 170 may be formed with a handle and may allow removal and remounting by pulling the filter unit 170 upward. The filter unit 170 is inserted into the filter insertion portion 131b to block the upstream of the evaporator 141.

The water pail 180 is accommodated into the base 113 to allow removal and mounting, and the water pail 180 is disposed below the lower duct 133. A through hole is formed on an upper surface of the water pail 180 and communicates with the condensation water passage. The water pail 180 is formed of a transparent plastic material to check an amount of water from the outside, and the water pail 180 may be accessed through the through hole 111b of the front cover 111.

The blower fan assembly 150 may include a blower fan 151, a blower fan motor 152, an exhaust duct 153 and an air discharge port 155. The blower fan 151, operated by the blower fan motor 152, may be provided at a downstream of the rear duct 135. The exhaust duct 153 may communicate with the blower fan 151 and may be formed at a downstream of the blower fan to transfer air flowed from the rear duct 135 to the blower fan 151 to the air supply port 221.

An air passage within the heat pump may be formed by the ducts 131, 133, 135 and the exhaust duct 153.

The air discharge port stepped portion 157 may be formed on the air discharge port 155. The air discharge port stepped portion 157 may horizontally extend from the air discharge port 155 to the outside and may bend upward toward the through hole 117 formed on an upper surface of the case. Air can be efficiently transferred to the air supply port 221 without any blockage by the air discharge port stepped portion 157. The air discharge port stepped portion 157 may be formed with an open surface wider than that of the air discharge port 155, and an edge of the air discharge port 155 and an edge of the air supply port 221 are separated from each other in a horizontal direction to efficiently supply air without being leaked through a gap between the air supply port 221 and the air discharge port 155. Accordingly, it may have an effect of efficiently transferring air without an additional sealing member between the air supply port 221 and the air discharge port 155. Accordingly, even though having a structure in which a connecting member (or fixing member) is not provided between the air supply port 221 and the air discharge port 155 to easily separate the heat pump from the cabinet, air may be efficiently transferred.

However, a shape of the air discharge port stepped portion 157 may not be necessarily limited to the above description, and may be formed in a taper shape as shown in the foregoing taper portion 224. In other words, the air discharge port stepped portion 157 may be formed with a shape with an inclined lateral surface. A sealing member may be formed in a fixed manner on a lower surface of the air supply port 221 rather than the air discharge port stepped portion 157 to seal between the air supply port 221 and an upper surface of the case 110.

The heat pump controller 160 may drive the refrigerant compression cycle and perform control required for other operations of the heat pump. The heat pump controller may control the heat pump according to a plurality of operation modes. The plurality of operation modes may include a drying mode configured to control operation of the heat pump when the heat pump is mounted on (or at) the cabinet and a dehumidification mode configured to control operation of the heat pump when the heat pump is separated from the cabinet.

Figure 10:
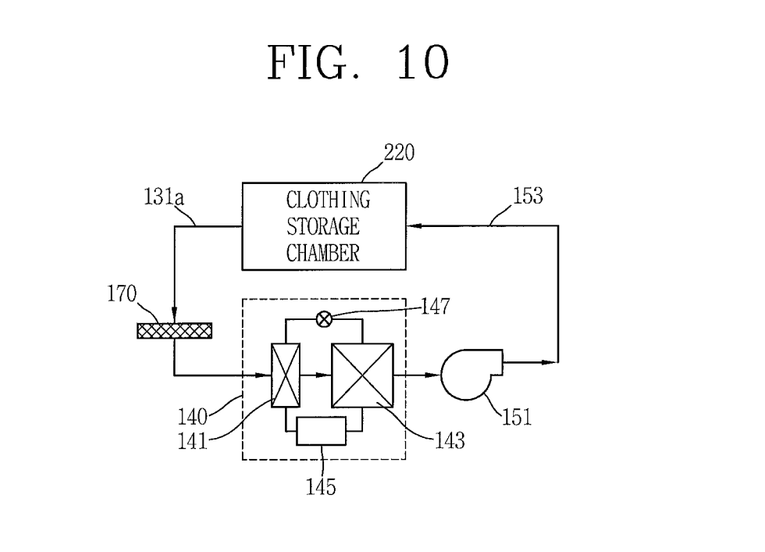
FIG. 10 is an operation state view illustrating an operation state of the embodiment of FIG. 1 based on the flow of air.

Operation of the heat pump in the drying mode may be described in detail with reference to FIG. 10. A direction of an arrow in FIG. 10 may indicate a flow direction of air.

In the drying mode, the heat pump may supply dry air to the clothing storage chamber. The blower fan motor 152 may be turned on by the heat pump controller to operate the refrigerant compression cycle 140. When air in the clothing storage chamber 220 flows into the air intake port 131a by the blower fan 151, air is heated while passing through the condenser 143. As used hereinafter air heated by the condenser 143 in the drying mode may be referred to as dry air. In this manner, dry air heated and produced by the condenser 143 may be transferred to the air supply port 221 through the blower fan 151 and flow into the clothing storage chamber 220. Humidified air, while drying clothes in the clothing storage chamber, may be transferred again to the heat pump through the air intake port 131a, and cooled while passing through the evaporator 141, and then heated again in the condenser 143.

In the dehumidification mode, the heat pump may supply dehumidified air to the outside. The clothing storage chamber 220 shown in FIG. 10 may become the outside. The blower fan motor 152 may be turned on by the heat pump controller to operate the blower fan 151. The refrigerant compression cycle may be driven based on the heat pump controller. The heat pump controller may control the refrigerant compression cycle in such a manner that the temperature of the dehumidified air is less than that of the dry air. When external air flows into the air intake port 131a by the blower fan 151, air is dehumidified while passing through the condenser 143. Condensation water produced at this time may be collected into the water pail 180 through the condensation water passage, and dehumidified air while passing through the condenser 143 is passed through the condenser 143 and is supplied to the outside through the exhaust duct 153. At this time, the temperature of dehumidified air is less than that of the dry air.

According to the foregoing configuration, an operation mode when the heat pump is separated from the cabinet to be independently operated, is different from an operation mode when the heat pump is mounted on the cabinet to be operated, thereby having an effect of enhancing energy efficiency while being operated independently. In other words, a lot of energy may be required when the heat pump is mounted on the cabinet since dry air with a temperature sufficient to dry clothes in the clothing storage chamber should be supplied, whereas relatively low energy may be required to dehumidify external air when the heat pump is separated from the cabinet. Accordingly, in the drying mode, which is an operation mode when the heat pump is independently operated, dehumidified air having a temperature less than that of the dry air may be produced to enhance energy efficiency.

According to an embodiment of allowing the heat pump controller 160 to control the refrigerant compression cycle 140, the heat pump controller may control the driving speed (Hz) of the compressor 145. The compressor may be a variable type compressor in which the driving speed varies. The heat pump controller controls in such a manner that a compressor driving speed in the drying mode is higher than that in the dehumidification mode. Accordingly, the driving speed of the compressor is higher in the drying mode, and a quantity of heat transferred through refrigerant in the drying mode is greater than a quantity of heat transferred through refrigerant in the dehumidification mode, and thus the temperature of the dry air is higher than that of the dehumidified air.

According to another embodiment of allowing the heat pump controller 160 to control the refrigerant compression cycle 140, the heat pump controller may control an extent of compressing refrigerant in the compressor 145, namely a compression ratio. The heat pump controller may control in such a manner that a compression ratio of the compressor in the drying mode is greater than that in the dehumidification mode. Accordingly, since a compression ratio of refrigerant in the drying mode is higher, the quantity of heat transferred by the dry air is greater than that transferred by the dehumidified air and the temperature of the dry air is higher than that of the dehumidified air.

The compressor 145 may include a plurality of compression chambers. The number of compression chambers operated in the drying mode by the heat pump controller is greater than that operated in the dehumidification mode. Otherwise, the compressor 145 may be a multi-stage compressor. The number of stages of compressing refrigerant in the drying mode by the heat pump controller is greater than that in the dehumidification mode. The detailed configuration of the compressor 145 may not be necessarily limited to this, and any compressor in which the compression power of refrigerant is variable may be used.

Figure 8:
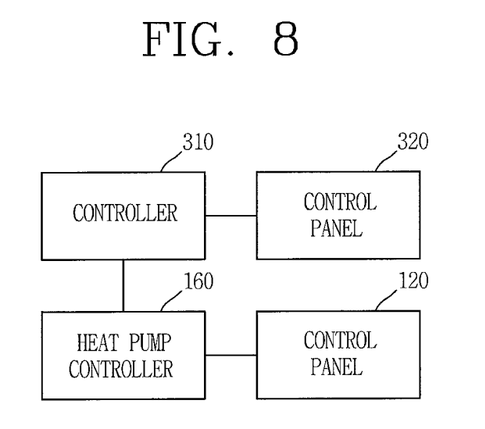
FIG. 8 is a block diagram illustrating a state in which a heat pump controller, a heat pump control panel, a controller of a clothes treating apparatus, and a control panel of the clothes treating apparatus are electrically connected in the embodiment of FIG. 1.

Referring to FIG. 8, the heat pump controller 160 may be electrically connected to the controller 310 and the control panel 320 of the clothes treating apparatus installed in the cabinet 200, and may also be electrically connected to the control panel 120 (of the heat pump). The heat pump controller 160 may receive a control command from the controller 310 and the control panel 320 (of the clothes treating apparatus) when the heat pump 100 is mounted on the cabinet 200, and the heat pump controller 160 may receive a control command from the control panel 120 (of the heat pump) when separated from the cabinet.

Figure 9:
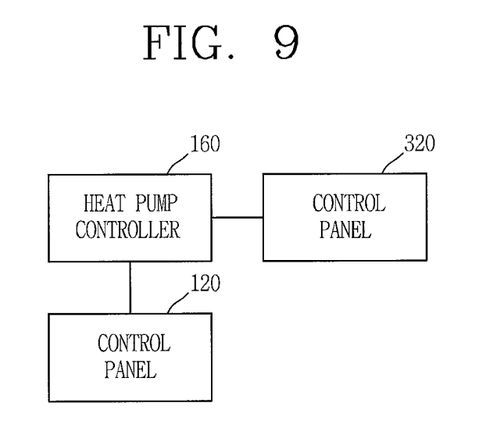
FIG. 9 is a block diagram illustrating a state in which a heat pump controller, a heat pump control panel, and a control panel of the clothes treating apparatus are electrically connected when the controller of the clothes treating apparatus is substituted by the heat pump controller in the embodiment of FIG. 1.

Embodiments may not be necessarily limited to the above description, and the controller 310 provided in the cabinet may be omitted and it may be controlled only with the heat pump controller 160. Referring to FIG. 9, the heat pump controller 160 may receive a control command directly from the control panel 320 (of the clothes treating apparatus). Accordingly, the heat pump controller 160 may receive a control command from the control panel 320 (of the clothes treating apparatus) when mounted on the cabinet and receive a control command from the control panel 120 (of the heat pump) to control the heat pump according to the control command.

Otherwise, a control panel may not be provided on the cabinet door 210, although a through hole may be formed on the door 210 to expose a portion located with the control panel 120 (of the heat pump) to the outside. The user may manipulate the control panel 120 (of the heat pump) while the door 210 is closed to execute the drying mode or execute other required operation modes of the clothes treating apparatus.

The control panel 120 (of the heat pump) may receive a control command and transmit the control command to the heat pump controller 160. The control panel 120 may include a display 121 for externally displaying an input button 125 allowing the user to enter various control commands, an inputtable or selectable command, and a current state of the heat pump, and/or the like. Otherwise, the display may be provided with a touch screen to receive a control command. The control command may include a drying mode and a dehumidification mode, other clothes treating modes of the clothes treating apparatus, and a power control command required to operate when the heat pump is separated from the cabinet, various air treating modes, and/or the like. For example, the air treating mode may include a filtering mode that can be defined as an operation mode in which the refrigerant compression cycle is not operated and only the blower fan and blower motor are controlled by the heat pump controller to filter and blow external air. A power button 123 may be provided on the control panel.

Figure 6:
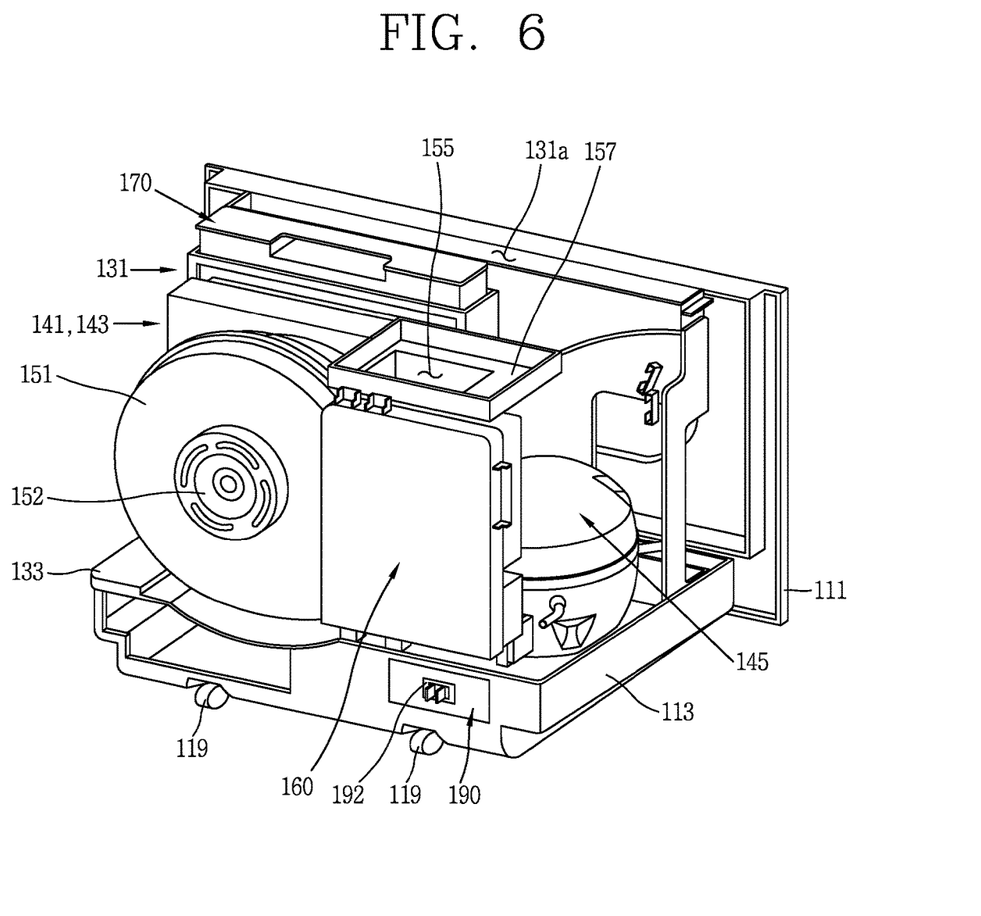
FIG. 6 is a rear perspective view illustrating a state in which a case body of a heat pump is removed.

The heat pump power supply unit 190, as a component of the foregoing heat pump, may be electrically connected to all components operated by the power supply to supply power. Referring to FIG. 6, the heat pump power supply unit 190 may include a connecting portion 192 electrically connected to the power unit 330 of the clothes treating apparatus fixed and provided at a lower portion of the cabinet 200 of the clothes treating apparatus. The heat pump power supply unit 190 may include a rechargeable battery to automatically charge power when connected to the power unit 330 of the clothes treating apparatus, and supply power when separated from the power unit 330 of the clothes treating apparatus.

The heat pump power supply unit 190 may include an outlet that can be directly connected to external power. The outlet may be provided therein such that the heat pump 100 is connected to external power when pulled out to be drawn out by the user to be separated from the cabinet, and pulled out again to be drawn in when accommodated into the cabinet to be used again. The outlet in the drawn-in state may be fixed to be connected to a power supply unit of the clothes treating apparatus as shown in FIG. 6. Accordingly, the outlet may be a connecting portion 192 electrically connected to the power supply unit of the clothes treating apparatus.

Figure 11:
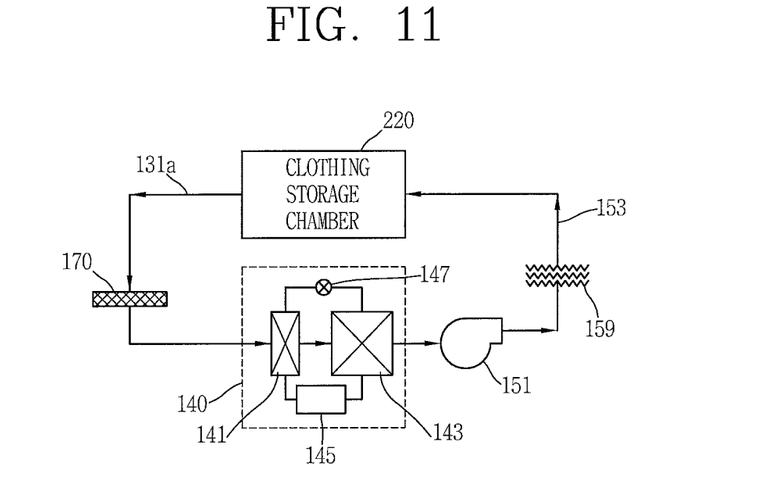
FIG. 11 is an operation state view illustrating an operation state of a clothes treating apparatus having a heat pump according to an embodiment.

FIG. 11 is a schematic diagram illustrating a clothes treating apparatus according to an embodiment of the present disclosure. Other embodiments and configurations may also be provided. A clothes treating apparatus may further include a heater 159 on a heat pump according to the foregoing embodiment. The heater 159 may be provided downstream of the condenser 143 to further heat air that has passed through the condenser 143. The heater 159 may be provided in the exhaust duct 153 as shown in FIG. 11.

The heat pump controller 160 (in a clothes treating apparatus) may control the refrigerant compression cycle 140 in various ways as described above to further increase the temperature of dry air than that of dehumidified air. The heat pump controller may control the heater 159 instead of controlling the refrigerant compression cycle to further increase the temperature of dry air than that of dehumidified air.

The heater 159 may be turned on in the drying mode and may be maintained in an off state in the dehumidification mode by the heat pump controller 160. The heat pump controller may control the intensity of the heater 159 in the drying mode and control the operation time. The intensity or operation time of the heater 159 controlled by the heat pump controller 160 may be set in various ways according to the clothes treating mode.

According to an embodiment, the heat pump may be separated from the clothes treating apparatus to be independently operated, thereby having an effect of using the heat pump in various ways.

Furthermore, according to an embodiment, an operation mode in which the heat pump is mounted on the cabinet may be allowed to be different from an operation mode in which the heat pump is separated from the cabinet, thereby having an effect of enhancing energy efficiency while the heat pump is independently operated.

As described above, it may be understood by those skilled in the art that the foregoing present invention can be implemented in other specific forms without changing the technical concept and essential characteristics thereof. Therefore, it should be understood that the foregoing embodiments are merely illustrative but not restrictive in all aspects. The scope of the present invention is defined by the appended claims rather than by the detailed description, and all changes or modifications derived from the meaning, scope and equivalent concept of the claims should be construed to be embraced by the scope of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A clothes treating apparatus comprising:
 a cabinet that includes a clothing storage chamber, a heat pump storage chamber, and a door to open and close the clothing storage chamber and the heat pump storage chamber;
 a control panel mounted on the door to receive a control command; and
 a heat pump configured to transfer air to the clothing storage chamber, and the heat pump being separably mounted at the heat pump storage chamber of the cabinet, wherein the heat pump includes:
  an evaporator, a compressor, a condenser and an expansion apparatus configured to form a refrigerant compression cycle;
  a heat pump controller configured to control operation of the heat pump according to a plurality of operation modes;
  a heat pump power supply unit;
  a case provided with the evaporator, the compressor, the condenser, the expansion apparatus, the heat pump controller and the heat pump power supply unit; and
  a heat pump control panel, provided at a surface of the case, to receive a control command, and the heat pump control panel to provide the control command to the heat pump controller,
 wherein the plurality of operation modes comprise:
  a drying mode configured to control operation of the heat pump when the heat pump is provided in the cabinet; and
  a dehumidification mode configured to control operation of the heat pump when the heat pump is separated from the cabinet,
 wherein when the heat pump is mounted at the cabinet, the heat pump controller receives a control command from the control panel mounted on the door, and
 when the heat pump is separated from the cabinet, the heat pump controller receives a control command from the heat pump control panel, wherein the heat pump includes an air intake port and an air discharge port to communicate with the clothing storage chamber, exposing an upper surface of the case of the heat pump, wherein the clothing storage chamber includes an air supply port to receive air from the air discharge port of the heat pump, and air discharge port to transfer air in the clothing storage chamber to the air intake port of the heat pump, wherein the air supply port and the air discharge port of the clothing storage chamber are formed to pass through a lower surface of the clothing storage chamber, wherein a taper portion is provided between the air discharge port of the clothing storage chamber and the air intake port of the heat pump, the taper portion extending in an inclined manner toward an edge of the air intake port from a frame edge of the air discharge port of the clothing storage chamber, and wherein an air discharge port stepped portion is formed on the air discharge port of the heat pump, the air discharge port stepped portion horizontally extending from the air discharge port of the heat pump to outside of the heat pump and bending upward toward the air supply port the clothing storage chamber.

2. The clothes treating apparatus of claim 1, wherein a temperature of air supplied by the heat pump in the drying mode is higher than a temperature of air supplied by the heat pump in the dehumidification mode.

3. The clothes treating apparatus of claim 1, wherein a driving speed of the compressor in the drying mode is faster than a driving speed of the compressor in the dehumidification mode.

4. The clothes treating apparatus of claim 1, wherein an extent of compressing refrigerant by the compressor in the drying mode is higher than an extent of compressing refrigerant by the compressor in the dehumidification mode.

5. The clothes treating apparatus of claim 1, wherein the heat pump further includes:
   a heater on an air passage, the heater provided downstream of the condenser, and
   the heat pump controller controls operation of the heater in the drying mode, and the heat pump controller maintains the heater to be in an off state in the dehumidification mode.

6. The clothes treating apparatus of claim 1, wherein the heat pump power supply unit includes a connecting portion to couple to an external power source.

7. The clothes treating apparatus of claim 6, further comprising:
   a power supply unit at the cabinet, and the power supply unit to connect to an external power source,
   wherein the connecting portion is to couple to the power supply unit.

8. The clothes treating apparatus of claim 1, wherein the heat pump includes a plurality of wheels provided on a base corresponding to a lower surface of the case in such a manner that a distance between two wheels provided at a front side of the base is different from a distance between two wheels provided at a rear side of the base.

9. The clothes treating apparatus of claim 8, wherein guide rails are provided on a lower surface of the heat pump storage chamber to guide the two wheels of the rear side of the base.

* * * * *